(12) United States Patent
Robertson

(10) Patent No.: US 6,695,215 B2
(45) Date of Patent: Feb. 24, 2004

(54) HYPERLINK ACCESS SYSTEM

(75) Inventor: Philip Keith Robertson, Middle Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,950

(22) Filed: Aug. 31, 2001

(65) Prior Publication Data

US 2002/0023953 A1 Feb. 28, 2002

(30) Foreign Application Priority Data

Aug. 31, 2000 (AU) .............................. PQ9835

(51) Int. Cl.[7] .............................................. G06K 19/06
(52) U.S. Cl. ........................................................ 235/492
(58) Field of Search ................................ 235/492, 441; 340/825.72

(56) References Cited

U.S. PATENT DOCUMENTS

| | | | |
|---|---|---|---|
| 5,015,830 A | * 5/1991 | Masuzawa et al. | 206/305 |
| 5,235,328 A | * 8/1993 | Kurita | 340/825.72 |
| 5,901,067 A | * 5/1999 | Kao et al. | 700/11 |
| 6,241,151 B1 | * 6/2001 | Swaine et al. | 235/379 |
| 6,308,202 B1 | * 10/2001 | Cohn et al. | 705/27 |

FOREIGN PATENT DOCUMENTS

| | | | | |
|---|---|---|---|---|
| AU | 199953527 | 10/1999 | | |
| WO | WO 95/33244 | 12/1995 | | |
| WO | WO 95/35534 | * 12/1995 | .......... | G06F/3/023 |
| WO | WO 99/06970 | 2/1999 | | |
| WO | WO 99/64976 | 12/1999 | | |

\* cited by examiner

*Primary Examiner*—Thien M. Le
*Assistant Examiner*—Lisa M Caputo
(74) *Attorney, Agent, or Firm*—Fitzpatrick, Cella, Harper & Scinto

(57) ABSTRACT

Disclosed is a read device (200) for reading a smartcard (100). The smartcard (100) has indicia (110, 112, 114, 116, 118, 120 and 122) formed thereon and a memory (102) having data stored therein wherein the card (100) is configured for insertion into the read device (200). The read device (200) includes a plurality of user operable switches (210, 212, 214, 216, 218, 220, 222 and 224) positioned around a receptacle (202,244) into which the smartcard (100) is insertable for reading the data and relation information to associate the data with the switches (210, 212, 214, 216, 218, 220, 222 and 224). The switches (210, 212, 214, 216, 218, 220, 222 and 224) are associated with the indicia (110, 112, 114, 116, 118, 120 and 122) on the card (100) visually. A processor (234) is provided for reading the data corresponding to a switch (210, 212, 214, 216, 218, 220, 222 and 224) pressed by a user based on the relation information, and operates to sending the related data to an external device. The smartcard (100) also has links (130, 132, 134, 136, 138, 140 and 142) associated with each indicia and arranged to associate the indicia with at least one of the switches (210, 212, 214, 216, 218, 220, 222 and 224).

26 Claims, 7 Drawing Sheets

HYPERLINK ACCESS SYSTEM

FIELD OF THE INVENTION

The present invention relates to user interfaces to appliances and networked computing resources and, in particular, to a hand portable electronic smartcard reading device.

BACKGROUND

International Patent Publication No. WO 95/35534 (Combaluzier), which has an English language equivalent published as Australian Patent Publication No. AU-A-28896/95, discloses an electronically programmable smartcard encoded with information and being readable by hand held remote control device having a keypad. The keypad incorporates a number of transparent keys regularly positioned over a slot into which the electronic smartcard is able to be inserted. Icons or indicia formed on the smartcard are electronically mapped, via data stored in the smartcard, to the corresponding overlying key of the keypad thereby enabling a user of the control device and smartcard to select a remote control function using a key overlying a corresponding icon. The device was described for use, with one smart card and keypad combination as a combined remote control for a television set and one or more other appliances such as a video cassette recorder or radio. It has also been disclosed to use a similar read device with multiple smartcards, each smartcard causing the device to control a different appliance.

Access to computer networks and the resources available therefrom is almost an essential part of modern commercial and private activity. Traditional methods for obtaining access to network computing resources utilise direct data entry into a computing terminal of the location of a resource desired to be accessed. For example, this typically occurs when a user of a personal computing device such as a desktop computer operates a browsing application during which access to resources, either on a local computer, local network or wide network such as the World Wide Web (WWW, or the "Web"), may be made. Web access is typically via uniform resource locaters (URL's) which may be typed via a keyboard into the web browser application as a specific address, or accessed via an electronically selectable hyperlink displayed to the user of the computing device. Electronic selection is typically performed by the clicking of a mouse or through some keyboard selection via the standard keyboard of the computing device. Such arrangements typically require a complex graphical user interface to be presented to the user to facilitate access, particularly if maximum functionality afforded within the network is desired to be utilised.

Whilst such networked access devices have the capability to perform a multitude of tasks, such performance is not obtained without incurring reasonable financial costs in establishing the computing resource, as well as the computing cost in operating a high level application program. Traditional computing interfaces offer reasonable user convenience for a wide range of users.

Australian Patent Publication No. AU-A-53527/99 (Keronen et. al.) discloses a hand held smartcard reading device provided with a transparent touch panel having a region segmentation defining user selectable areas corresponding to the locations of icons printed on the corresponding smartcard. The device and the data recorded on the smartcard operated to provide access to computer or similar networks. With such an arrangement, the icons were not required to be printed on the smartcard according to a predetermined keypad layout, since the mapping of the overlying touch panel could- be uniquely defined by data programmed into the smartcard.

Disadvantages of the arrangement of WO 95/35534 are that the keypad defines only a fixed key layout, and also that the transparent keypad overlay is relatively expensive. Problems with the arrangement of AU-A-53527/99 relate to the cost of the transparent touch panel and also the extent to which users must, within the accuracy of the printing of the icons on the smartcard, press the specific area of the touch panel to activate the network connection referenced by the underlying icon.

SUMMARY OF THE INVENTION

It is an object of the present invention to substantially overcome, or at least ameliorate, one or more problems or difficulties associated with existing arrangements.

In accordance with one aspect of the present invention there is disclosed a system for accessing a user desired function, said system comprising:

at least one smartcard device, each said smartcard device comprising at least one (first) indicia formed on a surface of said smartcard and observable by a user thereof, and a memory device containing access information for at least one said user desired function associated with the corresponding said indicia;

a reader device for said at least one smartcard device, said reader device comprising a plurality of user operable switches positioned about a receptacle into which said smartcard is insertable for reading said access information, said receptacle providing for user observance of said indicia when said smartcard is so inserted; and a link associated with each said indicia and arranged to associate said indicia with at least one of said switches thereby enabling the user to access said desired function indicated by said corresponding indicia.

In accordance with another aspect of the present invention there is disclosed a smartcard for accessing at least one user desired function, said smartcard comprising:

at least one (first) indicia formed on a surface of said smartcard and observable by a user thereof;

a memory device containing access information for said desired function associated with the corresponding said indicia; and a link associated with each said indicia and arranged to associate said indicia with at least one user operable switch of a reader device for said smartcard thereby enabling the user to access said desired function indicated by said corresponding indicia.

In accordance with another aspect of the invention there is disclosed a read device for reading a smartcard, said smartcard comprising indicia formed thereon and a memory having data stored therein wherein said card is configured for insertion into said read device, said read device comprising:

a plurality of user operable switches positioned around a receptacle into which said smartcard is insertable for reading said data and relation information to associate said data with said each switch, wherein operable ones of said switches are associated with indicia on said smartcard visually; and a processor for reading said data corresponding to a switch pressed by a user based on said relation information and sending said data to an external device.

In accordance with another aspect of the invention there is disclosed a read device for reading a smartcard, said smartcard comprising indicia formed thereon and a memory having data stored therein wherein said card is configured for insertion into said read device, said read device comprising:

a plurality of user operable switches positioned around a receptacle into which said smartcard is insertable for reading said data and relation information to associate said data with said each switch, wherein operable ones of said switches are associated with indicia on said smartcard visually; and a processor for sending to an external device all of the data and relation information read from the smartcard in advance and sending a signal from a switch pressed by a user to the external device.

In accordance with another aspect of the invention there is disclosed a computer device for receiving signal from a smartcard reader having several switches, said computer device comprising a processor for receiving data and relation information to associate said data with said each switch, wherein operable ones of said switches are visually associated with each indicia on the smartcard to be inserted into the smartcard reader and for executing data corresponding to a signal when the signal was sent from the reader.

In accordance with another aspect of the invention there is disclosed a read device for reading a smartcard, said smartcard comprising indicia formed thereon and a memory having data stored therein, and wherein said card is configured for insertion into said read device, said read device comprising a plurality of user operable switches positioned around a receptacle into which said smartcard is insertable for reading said data and relation information to associate said data with said each switch, wherein said each switch is associated with each indicia on said smartcard visually.

Other aspects of the invention are also disclosed.

BRIEF DESCRIPTION OF THE DRAWINGS

One or more embodiments of the present invention will now be described with reference to the drawings in which.

DETAILED DESCRIPTION

Figure 1A:
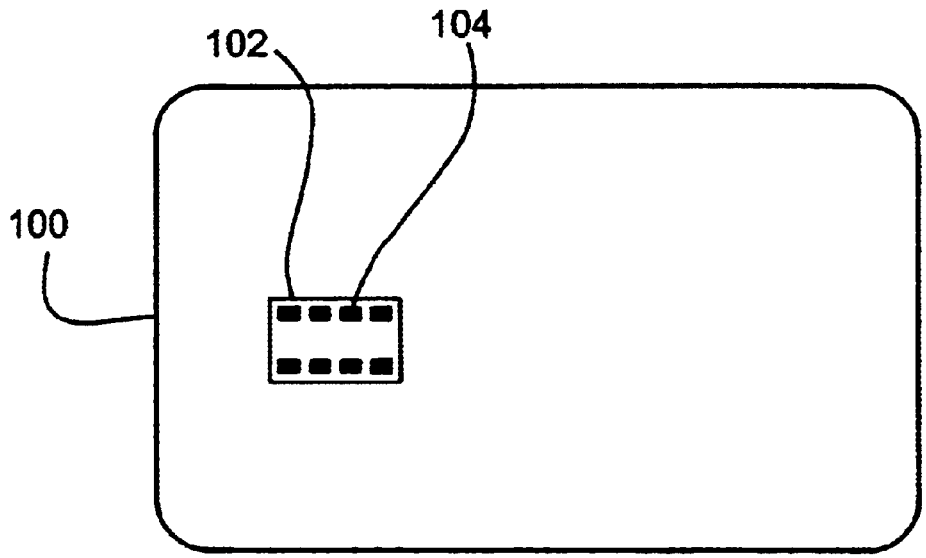
FIGS. 1A and 1B are underside and top views respectively of an electronic smartcard.
Figure 1B:
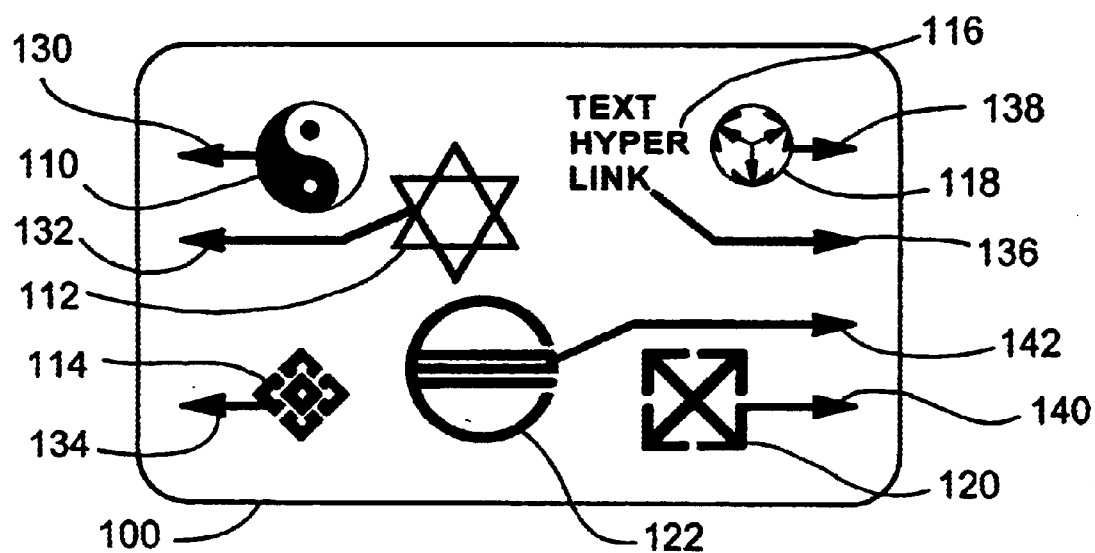

FIGS. 1A and 1B show a smartcard device 100 comprising a substantially planar substrate within which is positioned an integrated circuit memory device 102. The memory device 102 is provided with a number of contacts 104 exposed on one face of the smartcard 100 and configured for electrical connection an appropriate device thereby enabling the memory device 102 to be written with data and for such data to be read. Alternative smartcard arrangements may be implemented using, instead of the memory 102, a CPU device, a magnetic strip or a barcode, for example.

Arranged on an opposite face of the smartcard 100 are a number of icons, images or indicia 110, 112, 114, 116, 118, 120 and 122, each of which is provided to be indicative of a desired computing network facility or remote control function that may be selected by a user. The icons 110, 112, 114, 116, 118, 120 and 122 are each visually interpretable by the user to indicate the corresponding facility or function and may include some form of illustration such as the icon 110, or text such as the icon 116 or a combination of both. Each of the icons 110, 112, 114, 116, 118, 120 and 122 is preferably printed onto the surface of the smartcard 100. Alternatively, the icons may be formed upon a transfer sheet, or sticker, which may be affixed to the substrate of the smartcard 100.

Associated with each of the icons 110, 112, 114, 116, 118, 120 and 122 is a corresponding arrow-headed line 130, 132, 134, 136, 138, 140 and 142 which indicates an association between the corresponding icon and a position about a periphery of the smartcard 100. The lines 130, 132, 134, 136, 138, 140 and 142 are preferably formed on the smartcard in the same manner as the icons 110, 112, 114, 116, 118, 120 and 122.

Figure 2A:
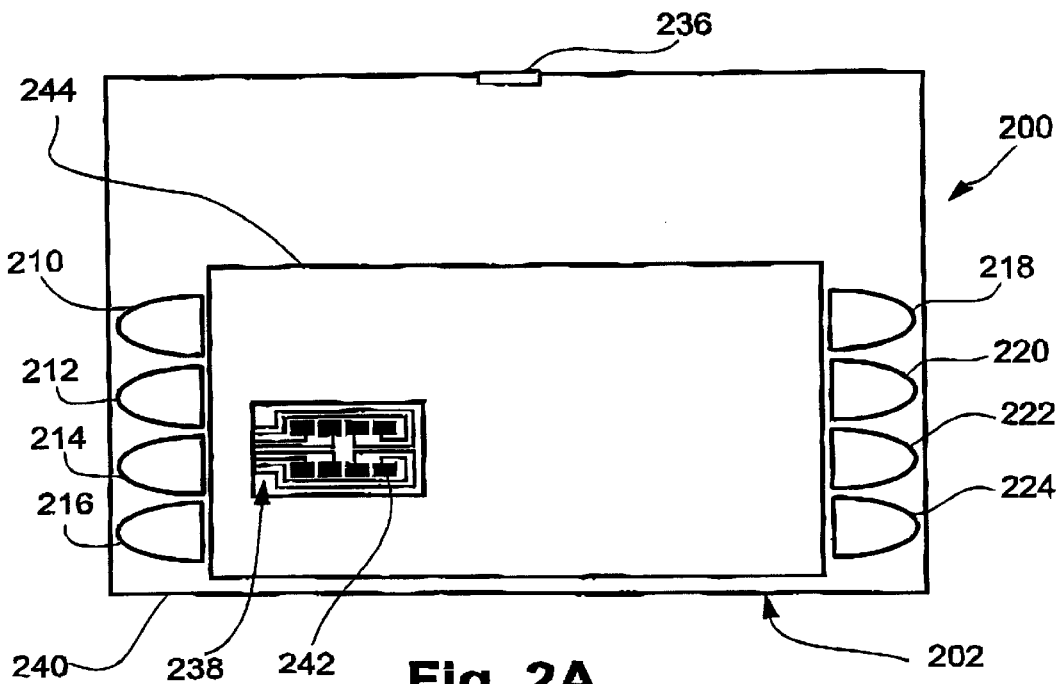
FIG. 2A is a plan view of a smartcard reading device.
Figure 2B:
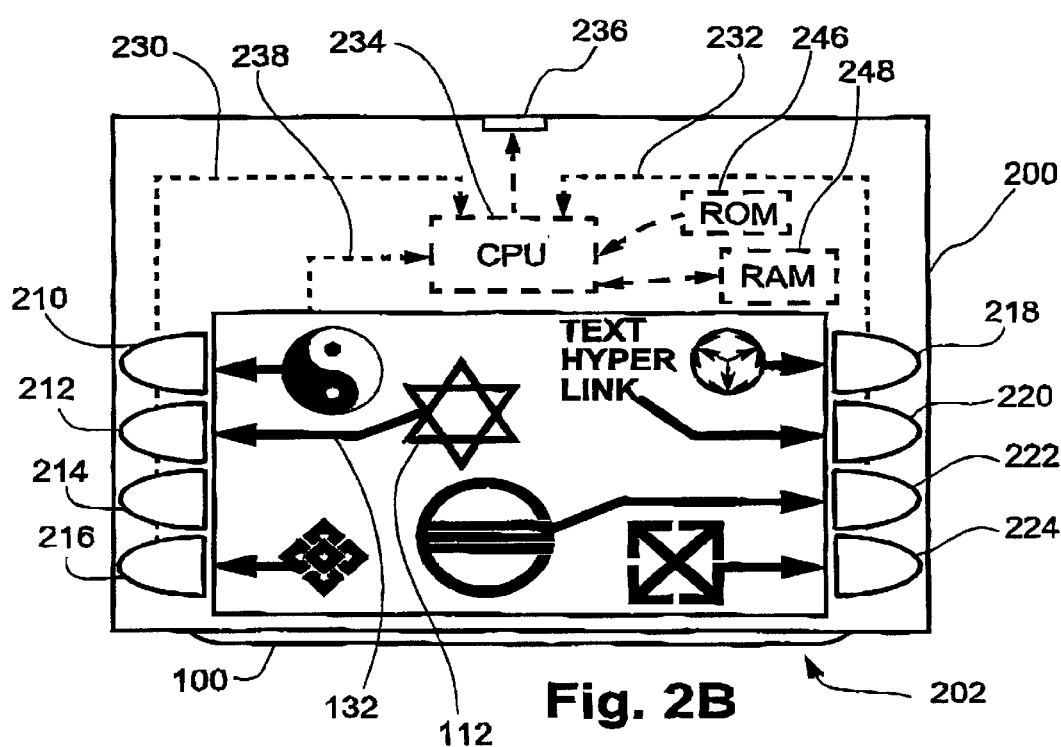
FIG. 2B is a view similar to FIG. 2A but with the smartcard of FIGS. 1A and 1B inserted for reading.

FIGS. 2A and 2B show a reader device 200 configured for reading data from the smartcard 100. The reader 200 is formed by a casing 240 having a slot 202 that permits insertion of the smartcard 100 into the reader 200 so that the contacts 104 of the smartcard 100 are positioned to engage with complementary contacts 242 of the reader 200. With such engagement, the contents of the memory device 102 may be read by the reader device 200. As will be apparent from FIG. 2B, associated with the slot 202 is a window opening 244 through which the various icons 110, 112, 114, 116, 118, 120 and 122 and lines 130, 132, 134, 136, 138, 140 and 142 are visible whilst the smartcard 100 is held in position within the slot 202 and in engagement with the contacts 242. The window 244 has arranged about its periphery a number of push button switches 210, 212, 214, 216, 218, 220, 222 and 224 arranged at predetermined positions about the window 244. Where the alternative smartcard arrangements described above are used, corresponding variations to the reader are necessary.

As will be apparent from FIG. 2B, each of the lines 130, 132, 134, 136, 138, 140 and 142 points from one of the icons 110, 112, 114, 116, 118, 120 and 122 to a location of a corresponding one of the switches 210, 212, 214, 216, 218, 220, 222 and 224. As a consequence, the lines 130, 132, 134, 136, 138, 140 and 142 form a physical and visually interpretable link between each icon 110, 112, 114, 116, 118, 120 and 122 and the corresponding switch 210, 212, 214, 216, 218, 220, 222 and 224. The lines 130, 132, 134, 136, 138, 140 and 142 may, in this regard, be considered to be "physical hyperlinks" and provide a perceptible linkage mechanism between the icons 110, 112, 114, 116, 118, 120 and 122 and the switches 210, 212, 214, 216, 218, 220, 222 and 224. Alternatively, or additionally, each of the icons 110, 112, 114, 116, 118, 120 and 122 can be visually associated with corresponding one of the switches 210, 212, 214, 216, 218, 220, 222 and 224 by having the same color or by having a correspondingly unique tactile representation.

A processor or CPU 234 formed within the reader 200 as depicted in FIG. 2B is configured to execute a software program to read data, such as command or access information, and relation information. The program is typically stored in a read-only-memory (ROM) 246 within the reader 200. The relation information is derived from a table, such as that shown in FIG. 4, which is stored in the memory device 102 and is retrieved by the CPU 234 via a bus connection 238 to the contacts 242. The relation information read from the memory device 102 may be stored in a RAM 248, also coupled to the CPU 234 as illustrated in FIG. 2B. In some implementations, the ROM 246 and RAM 248 may be integrally formed within the CPU 234. The software program operates to associate the signal, read from the switches 210, 212, 214, 216, 218, 220, 222 and 224 via connections 230 and 232, with the relation information stored in the RAM 248.

Figures 4, 5A:
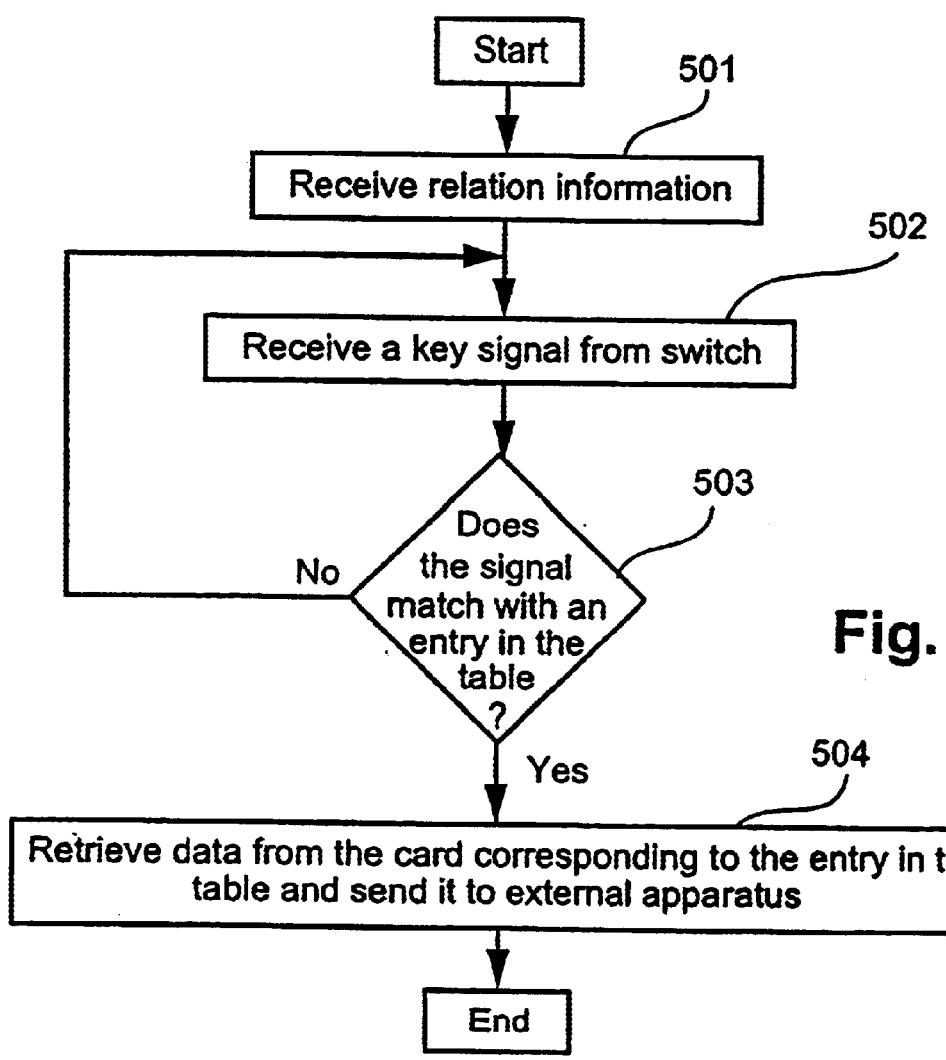
FIG. 4 is a relation information table used in the reading device of FIGS. 2A and 2B.
FIGS. 5A and 5B are flowcharts depicting alternate modes of operation of the reading device of FIGS. 2A and 2B.

The smartcard 100 typically stores data (command or access data, such as a URL) and the relation information in the memory device 102. One form of the software program implemented by the CPU 234 is represented by the flowchart of FIG. 5A. As seen in FIG. 5A, in step 501, the CPU 234 retrieves the relation information from memory device 102 and stores it in the RAM 248. In step 502, the CPU 234 receives a key signal from one of switches 210, 212, 214, 216, 218, 220, 222 and 224 that has been pressed by a user. In step 503, the CPU 234 determines if the key signal can be mapped to corresponding data using the relation information. When it is determined that the signal can be so mapped, step 504 follows and the CPU 234 retrieves the data corresponding to the key signal from the smartcard 100 and sends the data to an external apparatus, such as a computer device or appliance to be controlled. When it is determined in step 503 that the key signal does not match any data of the relation information, the CPU 234 returns the program to step 502 to await receipt of another signal from the switches 210, 212, 214, 216, 218, 220, 222 and 224. Such may be the case, for example, when the switch 214 is depressed, as the switch 214 is not associated with any one of the icons 110, 112, 114, 116, 118, 120 and 122.

Figure 5B:
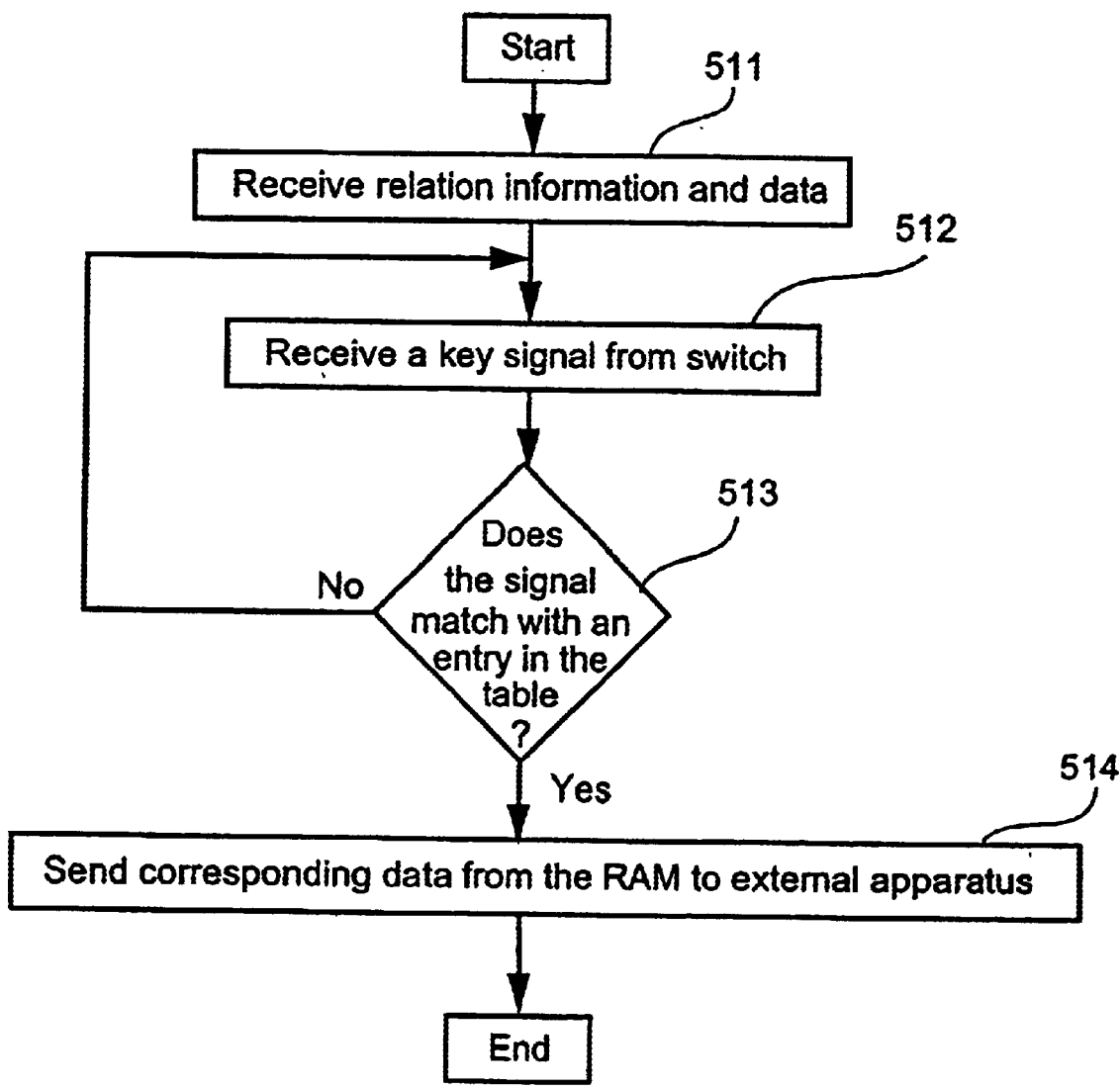

Another form of a software program that may be implemented by the CPU 234 is represented by the flowchart of FIG. 5B. As seen in FIG. 5B, in step 511, the CPU 234 initially retrieves the relation information and corresponding data from memory device 102 and stores it in the RAM 248. In step 512, the CPU 234 receives a key signal from one of switches 210, 212, 214, 216, 218, 220, 222 and 224 that has been pressed by a user. In step 513, the CPU 234 determines if the key signal can be mapped to corresponding data using the relation information. When it is determined that the signal can be so mapped, step 514 follows and the CPU 234 sends the corresponding data from the RAM 248 to the external apparatus.

As will be apparent from the two alternatives described above, the table may comprise the specific data to be actions, or a reference to that data.

By using the relation information, the data corresponding to one of switches 210, 212, 214, 216, 218, 220, 222 and 224 pressed by a user is read from the smartcard 100 and sent to an external apparatus. The user can therefore manipulate the external apparatus, such as a cable television set top box, by sending a command, such as a command to change a television channel, to the set top box. Also, the user can access the external apparatus, such as the set top box, by sending access information such as a URL or memory address to read data from a memory within the external apparatus.

Communication between the reader 200 and the external apparatus is performed using a communications device, such as an infra-red transmitter 236, coupled to the CPU 234. Other communications arrangements such as a USB or RS232 may alternatively be used It will be apparent from the foregoing that the lines 130, 132, 134, 136, 138, 140 and 142 provide a means of directly associating an icon 110, 112, 114, 116, 118, 120 and 122, which represents a user desired service access or function, with a user actuable means (ie. the switches 210, 212, 214, 216, 218, 220, 222 and 224) for instigating that service access or function.

Whereas the arrangements of FIGS. 1A to 2B are shown configured for "landscape" insertion of the card 100 into the reader 200, it will be appreciated that end or "portrait" insertion may be similarly configured.

The external apparatus described above may be a simple appliance for which remote control by the user is desired. Such may include a television receiver, a home theatre console or a video cassette recorder, to name but a few. In such instances the reader 200 is configured, having interpreted the key signal, to emit the corresponding data in a form able to be received and processed by the external apparatus, in a manner corresponding to traditional remote control devices associated with such appliances. As such, the reader 200 and associated smartcard 100 may be used not only form the issuing of commands to the external apparatus, but also for data entry, such as entering names, dates, times, monetry amounts, and so on.

Figure 3:
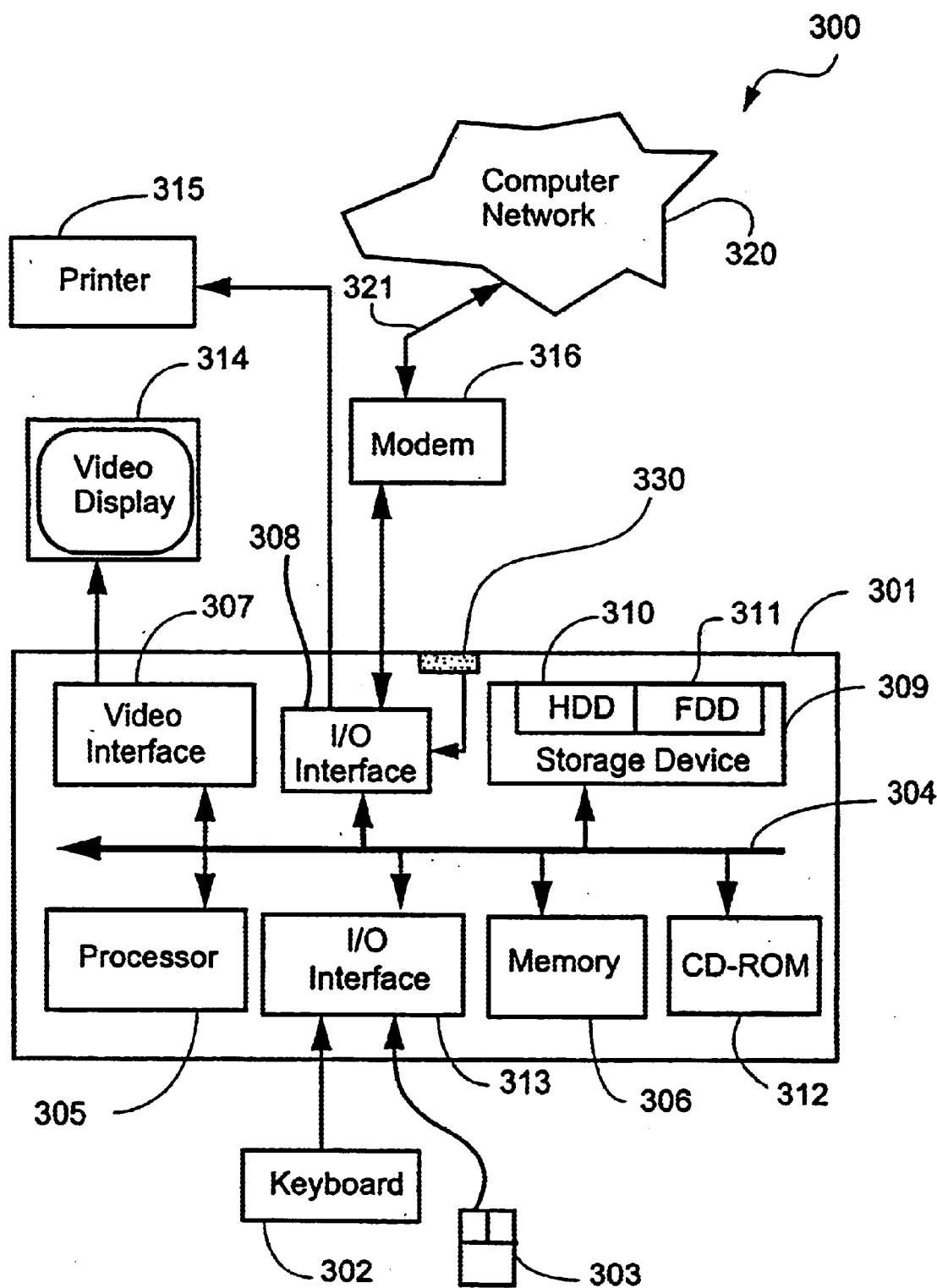
FIG. 3 is a schematic block diagram representation of a computer system communicable with the reader device of FIGS. 2A and 2B.

FIG. 3 shows a specific example of the external apparatus implemented in this case by a computer system 300 which comprises a general-purpose computer module 301, input devices such as a keyboard 302 and mouse 303, and output devices including a printer 315 and a display device 314. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an I/O interface 308 for the modem 316. The I/O interface 308 also couples to an infra-red receiver device 330, arranged to complement the transmitter 236 of the reader 200. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner which results in a conventional mode of operation of the computer system 300 known to those in the relevant art. Examples of computers on which the embodiments can be practised include IBM-PC's and compatibles, Sun Sparcstations or alike computer systems evolved therefrom.

Alternatively, the computer module 301 may be formed by a purpose-built device and utilised as a "set top box" in conjunction with a television set operating as the display 314.

Operation of the computer system 300 may be by way of an application program executing within the computer module 301 to provide the desired network access corresponding to the selected icon 110, 112, 114, 116, 118, 120 and 122. The method of access is effected by instructions in the software that are carried out by the computer module 301. The software may be divided into two separate parts; one part for carrying out the specific network access, and another part to manage an interface with the user operating the reader 200. The software may be stored in a computer readable medium, including the storage devices described below, for example. The software is loaded into the computer module 301 from the computer readable medium, and then executed by the computer module 301. A computer readable medium having such software or computer program recorded on it is a computer program product. The use of the computer program product in the computer module 301 preferably effects an advantageous apparatus for network access.

Typically, the application program is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable medium including magnetic tape, a ROM or integrated circuit, a magneto-optical disk, a radio or infra-red transmission channel between the computer module 301 and another device, a computer readable card such as a PCMCIA card, and the Internet and Intranets including e-mail transmissions and information recorded on Websites and the like. The foregoing is merely exemplary of relevant computer readable mediums. Other computer readable media may be practiced.

Where the memory chip device 102 incorporates a network address, associated with the icon 112, depression of the switch 212 provides for that address to be supplied over the infra-red communication channel between the transmitter 236 and receiver 330 whereby the I/O interface 308 and the operation of the computer module 301 perform a network access on the computer network 320 to obtain desired information from the network address. Information returned by the network 320 may be displayed on the video display 314, proximate to the user of the reading device 200. As desired, such information may also be hard copy reproduced by means of the printer 315. Where desired, information returned by the computer network 320 and presented on the video display 314 may provide the user with the capacity to make selections from one or more of the remaining icons provided on the smartcard 100.

The arrangement described provides a number of advantages of previous arrangements, including those indicated above. Firstly, the data input system formed by the reader 200 and the smartcard 100 does not require a transparent touch panel as in AU-A-53527/99, since the provision of the lines 130, 132, 134, 136, 138, 140 and 142 and the positioning of the switches 210, 212, 214, 216, 218, 220, 222 and 224 provides a corresponding function. Further, the arrangement of the reader 200 provides for low cost manufacture through the incorporation of simple push button switches as opposed to a transparent touch panel matrix. Further, the provision of the lines 130, 132, 134, 136, 138, 140 and 142 provide for the user to immediately associate the corresponding icon 110, 112, 114, 116, 118, 120 and 122 with the corresponding push button 210, 212, 214, 216, 218, 220, 222 and 224, thereby providing immediate use by any user without specific prior knowledge of the use of the reader device 200. One specific advantage, is that the same smartcard 100 may be used with the reader 200, as well as each of the readers of AU-A-53527/99 and WO 95/35534. When used with the prior art arrangements, the lines 130, 132, 134, 136, 138, 140 and 142 have no function and may be ignored.

Further, like AU-A-53527/99, but unlike WO 95/35534, the system formed from the smartcard 100 and the reader 200 provides for the icons to be positioned irregularly across the surface of the smartcard 100, whilst the lines 130, 132, 134, 136, 138, 140 and 142 provide the desired association with the push buttons 210, 212, 214, 216, 218, 220, 222 and 224. Such irregularity of positioning is seen in FIG. 1A.

The lines 130, 132, 134, 136, 138, 140 and 142 can, like the icons 110, 112, 114, 116, 118, 120 and 122 be printed on the surface of the smartcard, or alternatively onto a transfer or sticker applied to the smartcard. The icons 110, 112, 114, 116, 118, 120 and 122 and 130, 132, 134, 136, 138, 140 and 142 may also be printed in a variety of colours to provide for ease of association with the push buttons 210, 212, 214, 216, 218, 220, 222 and 224 Further, those colours may be linked to the different colours of the push buttons whereby for example, a red printed line points to a red coloured push button.

A further extension of the above is where the link between icon and switch is not formed by an arrow printed on the smartcard as in FIGS. 1 and 2, but for example, may be provided by a specific colour of the icons 110, 112, 114, 116, 118, 120 and 122 as printed. For example, icons may be printed in specific colours corresponding to specific coloured keys. A link is thus formed by a colour association between the icon and the corresponding push button.

In a further alternative, the smartcard 100 and the reader device 200 may be devised to assist visually impaired users whereby textures are used on the surface of the smartcard 100 to form the icons 110, 112, 114, 116, 118, 120 and 122 and, where necessary the links 130, 132, 134, 136, 138, 140 and 142. Corresponding textures are also used on the push-buttons 210, 212, 214, 216, 218, 220, 222 and 224 to provide tactile feedback to the visually impaired user. For example, where the icons and lines may be formed as raised fixtures that connect or link up with the corresponding push buttons 210, 212, 214, 216, 218, 220, 222 and 224. In a further alternative, where the connecting lines are not formed, each of the icons 110, 112, 114, 116, 118, 120 and 122 may be performed using a unique tactile representation corresponding to one of the push buttons 210, 212, 214, 216, 218, 220, 222 and 224.

As seen in FIGS. 2A and 2B, the smartcard reader 200 incorporates eight push buttons yet the smartcard 100 incorporates only seven icons and corresponding links. As a consequence, the push button 214 has no function when used with the specific smartcard 100 illustrated. In other configurations, where desired a single icon may be associated with more than one push button 210, 212, 214, 216, 218, 220, 222 and 224 whereby the plurality of correspondingly referenced push buttons perform the same function if and when depressed.

Figure 6:
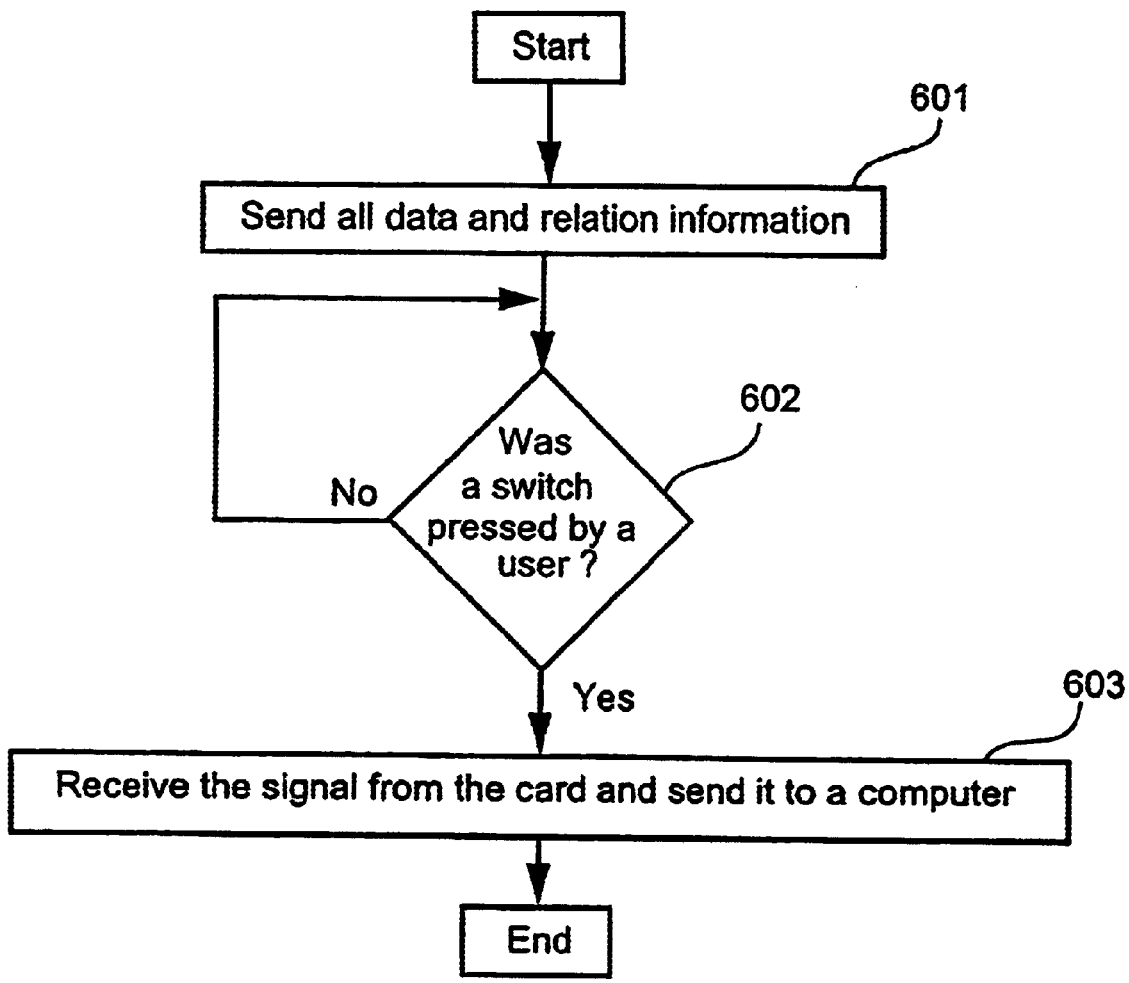
FIG. 6 is a flowchart depicting another mode of operation of the reading device of FIGS. 2A and 2B.

In another embodiment, the reader 200 can send all of the data and relation information stored in the smartcard 100, to the external device such as the computer 300. Such can occur when the smartcard 100 is initially inserted into the reader 200, or upon the user pressing one or more of the switches 210, 212, 214, 216, 218, 220, 222 and 224. In this case, the CPU 234 executes another software program represented by the flowchart of FIG. 6. In step 601 of FIG. 6, the CPU 234 sends all of the data and relation information to the external device in one operation when the user presses one of the switches 210, 212, 214, 216, 218, 220, 222 and 224, or when the smartcard 100 is inserted into the reader 200. In step 602, the CPU 234 determines which, if any, switch has been pressed by a user. When it is determined that a switch was pressed, the CPU 234 receives a signal from the switch and sends it to the external device in step 603. According to this embodiment, by sending only the signal from reader 200 to the external device, the user can manipulate or access the external device (eg. the set top box) in a same manner of the first embodiment.

Figure 7:
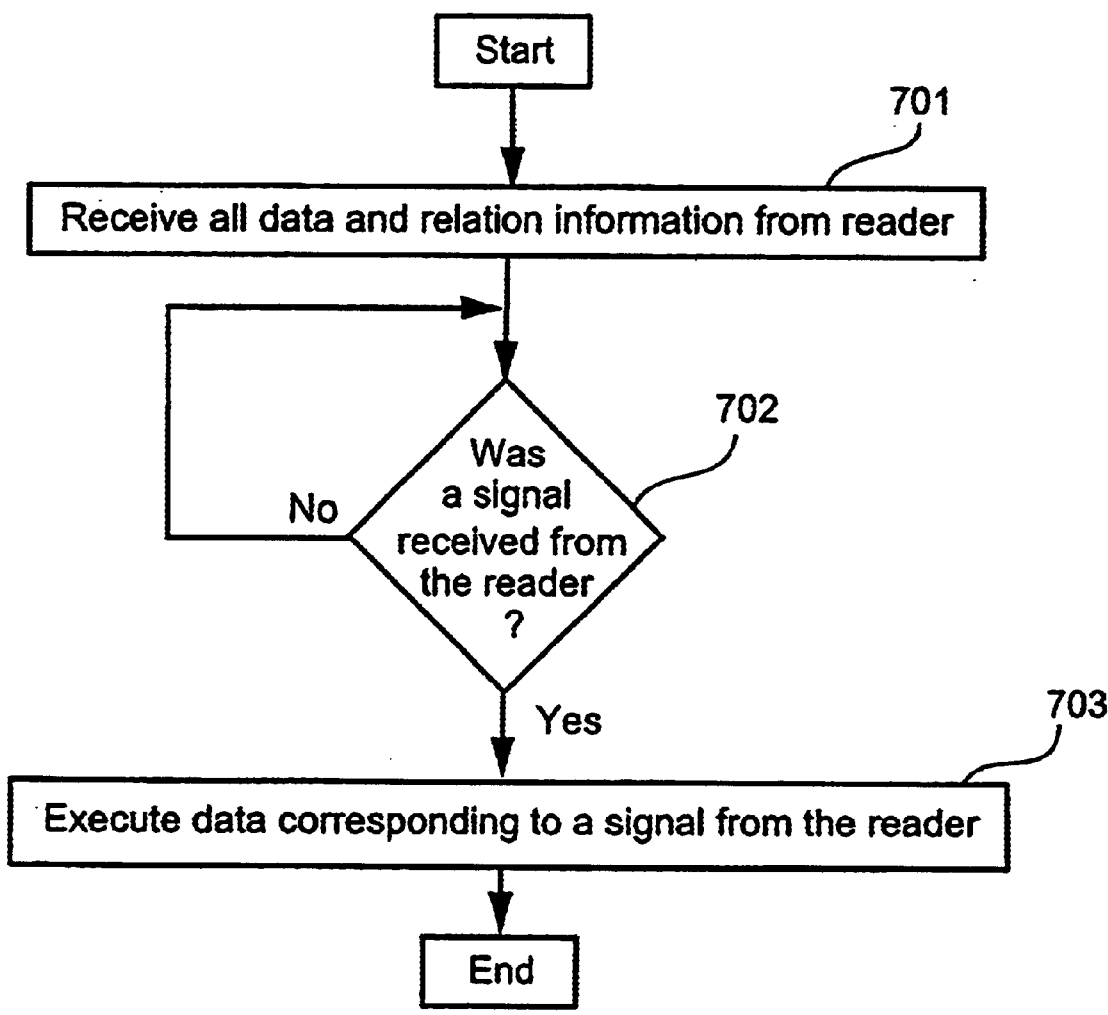
FIG. 7 is a flowchart depicting a mode of operation of an external device.

A CPU, such as the processor 305, in the external device can then execute another software program, such as that depicted by the flowchart shown in FIG. 7. This software program is typically stored in ROM or another type of memory medium such as the HDD 310 or memory 306. In step 701, the CPU 234 receives all of data and the relation information as shown in FIG. 4 from the reader 200. In step 702, the CPU (eg. processor 305) determines if a signal from the switches was sent from the reader 200. When it was determined that the signal was sent from reader 200, the CPU (eg. processor 305) executes the data corresponding to the switch signal based on the relation information according to step 703. When it is determined in step 702 that the signal was not sent from reader 200, the CPU (eg. processor 305) executes step 702. After receiving all of data and relation information from the reader 200 in advance, by receiving only a switch signal from the reader, the user can manipulate or access the external device, such as a set top box, in a corresponding manner to that of the first embodiment.

The foregoing describes only a number of embodiments of the present invention, and modifications can be made thereto without departing from the scope of the present invention.

What is claimed is:

1. A system for accessing at least one user desired function, said system comprising:
    at least one smartcard device, each of said at least one smartcard device comprising at least one (first) indicia formed on a surface of said smartcard and observable by a user thereof, and a memory device containing access information for said at least one user desired function associated with the corresponding said indicia;
    a reader device into which said at least one smartcard device can be inserted to thereby enable the reader device to read the access information, said reader device comprising a plurality of user operable switches positioned external to a window through which said inserted smartcard is visible; and
    a link associated with each of said indicia and arranged to associate said indicia with at least one of said switches thereby enabling the user to access said at least one user desired function indicated by said corresponding indicia.

2. A system according to claim 1, wherein said link comprises (second) indicia formed on said smartcard and associated with the corresponding said first indicia.

3. A system according to claim 2, wherein said second indicia comprises a colour of said first indicia, and said associated switch incorporates said colour.

4. A system according to claim 2, wherein said second indicia comprises a texture of said first indicia, and said switch incorporates said texture.

5. A system according to claim 2, wherein said second indicia comprises a path providing, when said smartcard is inserted in said reader device, a user observable virtual connection between said first indicia and said associated switch.

6. A system according to claim 5, wherein said path comprises a line extending from said first indicia to a location about a periphery of said smartcard adjacent said associated switch.

7. A system according to claim 3 or 6, wherein said first and second indicia are formed by printing.

8. A system according to claim 7, wherein said indicia further comprise texture formed on said smartcard.

9. A system according to any one of claims 1–6, wherein said first indicia is selected from the group consisting of text, an image, and an icon.

10. A system according to any one of claims 1–6, wherein said indicia are formed on a surface applied to a substrate of said smartcard.

11. A system according to claim 10 wherein said surface comprises a sticker.

12. A system according to any one of claims 1–6, wherein said user desired function comprises one of access to a computing resource or a remote control function of an appliance.

13. A smartcard for accessing at least one user desired function, said smartcard comprising:
    at least one (first) indicia formed on a surface of said smartcard and observable by a user thereof;
    a memory device containing access information for said desired function associated with the corresponding said indicia; and
    a physical link extending from said indicia arranged to associate said indicia with at least one user operable switch of a reader device for said smartcard thereby enabling the user to access said desired function indicated by said corresponding indicia.

14. A smartcard according to claim 13, wherein said link comprises a path extending from said corresponding indicia to a periphery of said smartcard at which said switch is adjacent when said smartcard is to be read by said reader device.

15. A read device for reading a smartcard, said smartcard comprising indicia formed thereon and a memory having data stored therein wherein said card is configured for insertion into said read device, to thereby enable the read device to read the data, said read device comprising:
    a plurality of user operable switches positioned external to a window through which said inserted smartcard is visible, the reader being adapted for reading said data and relation information to associate said data with said each switch, wherein operable ones of said switches are associated with indicia on said smartcard visually; and
    a processor for reading said data corresponding to a switch pressed by a user based on said relation information and sending said data to an external device.

16. A read device according to claim 15, wherein said data is access information to access said external device.

17. A read device according to claim 16, wherein said external device is a computer device.

18. A read device according to claim 15, wherein said data is a command to control said external device.

19. A read device according to claim 18, wherein said external device is an appliance.

20. A read device according to claim 15, wherein said data comprises data for entry to said external device.

21. A read device according to claim 15, wherein said switch is associated with the indicia by an arrow head line on said card.

22. A read device according to claim 15, wherein said switch is associated with the indicia by having the same color.

23. A read device according to claim 15, wherein said switch is associated with the indicia by having same unique tactile representation.

24. A read device for reading a smartcard, said smartcard comprising indicia formed thereon and a memory having data stored therein wherein said card is configured for insertion into said read device, to thereby enable the read device to read the data, said read device comprising:

- a plurality of user operable switches positioned external to a window through which said inserted smartcard is visible, the read device being adapted for reading said data and relation information to associate said data with said each switch, wherein operable ones of said switches are associated with each indicia on said smartcard visually; and
- a processor for sending to an external device all of the data and relation information read from the smartcard in advance and sending a signal from a switch pressed by a user to the external device.

25. A computer device for receiving signal from a smartcard reader having several switches positioned external to a window through which an inserted smartcard is visible, said computer device comprising a processor for receiving data and relation information to associate said data with said each switch, wherein operable ones of said switches are visually associated with each indicia on the smartcard to be inserted into the smartcard reader and for executing data corresponding to a signal when the signal was sent from the reader.

26. A read device for reading a smartcard, said smartcard comprising indicia formed thereon and a memory having data stored therein, and wherein said card is configured for insertion into said read device, to thereby enable the read device to read the data, said read device comprising a plurality of user operable switches positioned external to a window through which said inserted smartcard is visible, the read device being adapted for reading said data and relation information to associate said data with said each switch, wherein said each switch is associated with each indicia on said smartcard visually.

* * * * *